(12) United States Patent
Courson, Jr. et al.

(10) Patent No.: US 6,235,148 B1
(45) Date of Patent: May 22, 2001

(54) CHEMILUMINESCENT PHOTO-CURABLE ADHESIVE CURING AND BONDING SYSTEM

(76) Inventors: Billy F. Courson, Jr., 120 Palm Harbour Blvd.; Jody L. Wood, 109 Country Pl., both of Panama City Beach, FL (US) 32408; Brian Love, Virginia Tech, ESM 0219, Blacksburg, VA (US) 24061-0237

( * ) Notice: Subject to any disclaimer, the term of this patent is extended or adjusted under 35 U.S.C. 154(b) by 0 days.

(21) Appl. No.: 09/263,302

(22) Filed: Mar. 5, 1999

(51) Int. Cl.[7] ............................. B32B 31/28; F21K 2/06
(52) U.S. Cl. ............................ 156/379.6; 156/272.2; 156/273.3; 156/379.8; 362/34; 252/700; 428/40.1; 428/41.7
(58) Field of Search .................. 156/272.2, 273.3, 156/273.5, 275.5, 275.7, 247, 248, 379.6, 379.8; 427/487, 493, 532, 553, 595; 362/34; 252/700; 446/219; 428/40.1, 41.7, 41.8

(56) References Cited

U.S. PATENT DOCUMENTS

| | | | | |
|---|---|---|---|---|
| 5,254,197 | * | 10/1993 | Klems | 156/272.2 |
| 5,718,577 | * | 2/1998 | Oxman et al. | 433/37 |
| 5,962,097 | * | 10/1999 | Yamamoto et al. | 428/40.1 |
| 6,007,334 | * | 12/1999 | Suhonen | 433/39 |

* cited by examiner

Primary Examiner—Michael W. Ball
Assistant Examiner—Jessica Rossi

(57) ABSTRACT

A method and means for bonding an object to a surface use emitted light from a chemiluminescent source to cure a photo-curable adhesive. This non-electrical source of light cures different photo-curable adhesives which can be tuned to different wavelengths of light emitted by different chemiluminescent sources. The curing is relatively quick and requires no electrical lighting in a wide range of environmental conditions, including under water and in air, with little or no ancillary support. An inexpensive and expendable photo-curable adhesive system is provided which is greatly simplified as compared to electrically powered curing systems.

11 Claims, 1 Drawing Sheet

CHEMILUMINESCENT PHOTO-CURABLE ADHESIVE CURING AND BONDING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to adhesives for bonding objects together. In particular, this invention relates to curing photo-curable adhesives using light radiated from sources of chemiluminescent light in a variety of environments.

A wide variety of adhesives for joining objects together have been developed for many different tasks. Some adhesives are premixed and, after application, only need to be exposed to air for a while to cure. Others are mixed with catalysts or other compounds to initiate and speed the curing process. Generally speaking, conventional two-part adhesive mixtures have been sluggish and ineffective in cold seawater temperatures.

Adhesive compounds have been developed that initiate curing when they are radiated by light from an electric lamp. The light radiated from the lamps may be not only visible light, but other wavelengths, such as ultraviolet or infrared. Because of the disadvantages associated with radiating light underwater from lamps, contemporary electric light cured adhesives have been largely used in air. Efforts have been made to utilize light from an electrically driven LED (light emitting diode) to cure adhesives, however, this approach uses electrical energy to light the LED's while the adhesive cures. In addition, the use of electrical energy makes curing more expensive and complicated, and requires additional logistical support.

Thus, in accordance with this inventive concept, a need has been recognized in the state of the art for bonding systems that utilize chemiluminescent light sources to cure photo-curable adhesives quickly under water and in air, and do not require any electrical lighting.

SUMMARY OF THE INVENTION

The present invention is directed to providing a bonding system including a source of chemiluminescent light and a photo-curable adhesive cured by the radiated chemiluminescent light.

An object of the invention is to provide a system to cure photo-curable adhesives utilizing chemical sources of light.

Another object of the invention is to provide a system to adhesively bond objects underwater or in air using photo-curable adhesives and no ancillary electrical power.

Another object of the invention is to provide a system utilizing non-electrical sources of light for curing photo-curable adhesives.

Another object of the invention is to provide a system to bond objects under water or in air using fewer components.

Another object of the invention provides bonding using chemical light for producing cure in photo-curable adhesives.

Another object of the invention is to provide a system to cure photo-curable adhesive on demand by initiation of chemiluminescent reaction.

Another object of the invention is to provide a system having chemiluminescent sources of light emitting at different wavelengths of light to cure different photo-curable adhesives.

Another object is to provide systems having photo-curable methacrylate adhesives tunable to chemiluminescent light sources.

Another object of the invention is to provide systems having photo-curable epoxy tunable to chemiluminescent light sources.

Another object of the invention is to provide a system to cure photo-curable adhesive by breaking a membrane in a chemiluminescent module to initiate chemiluminescent reaction.

Another object of the invention is to provide a system to cure photo-curable adhesive mixing one chemical compound with another chemical compound in a chemiluminescent module to initiate chemiluminescent reaction.

Another object of the invention is to provide a system to cure photo-curable adhesive by injecting one chemical compound into another chemical compound in a chemiluminescent module to initiate chemiluminescent reaction.

Another object of the invention is to provide a system to cure photo-curable adhesives in a wide range of environmental conditions with little to no ancillary support.

Another object of the invention is to provide a system to cure photo-curable adhesives using chemically initiated radiation that is inexpensive and expendable.

Another object of the invention is to provide a system for curing photo-curable adhesives with chemically initiated radiation to repair underwater structure, such as the hull of a boat with the photo-curable adhesive.

These and other objects of the invention will become more readily apparent from the ensuing specification when taken in conjunction with the appended claims.

DESCRIPTION OF THE PREFERRED EMBODIMENT

Figure 1:
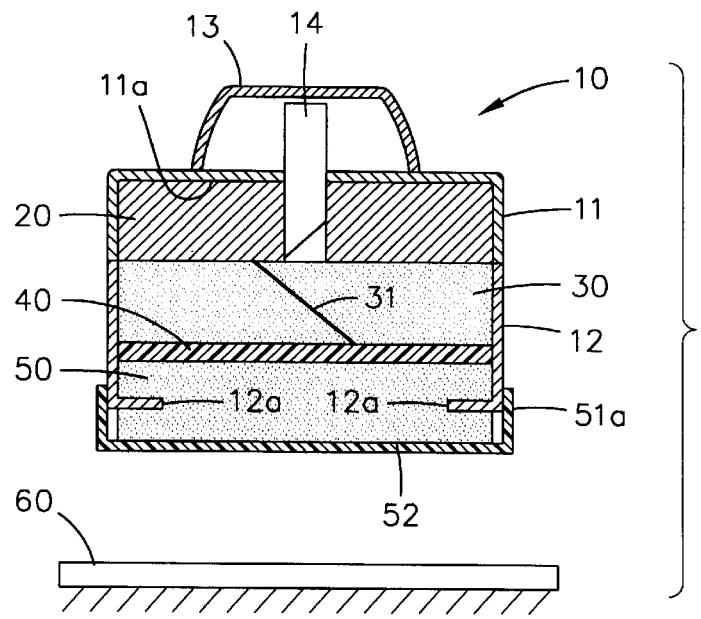
FIG. 1 is a cross-sectional view of an assembled chemiluminescent light curing system having a covered photo-curable adhesive and being transported to a submerged surface.

Referring to FIG. 1 of the drawings, chemiluminescent curing, or bonding system 10 provides the capability for bonding object 20 onto mounting surface 60. The bonding of this invention is particularly useful not only for underwater applications but also for air and other environments where surfaces and/or objects need to be bonded together. Surface 60 is shown as facing up, but it could be differently oriented.

Object 20 could be many different things that are useful underwater, such as sensors, ordnance, structural members, navigational aids, etc. Bonding system 10 has object 20 in housing 11 to help provide structural integrity and protect object 20 from surrounding water. Housing 11 may have interior reflective surface 11a to expedite curing by reflecting chemiluminescent light. Elongate tabs 12 extending downwardly from housing 11 have end portions 12a crimped inwardly to hold modular-like chemiluminescent light source 30, transparent chemical barrier 40, and photo-curable adhesive 50 of system 10 together in a compact package.

Flexible, shell-shaped push-button 13 extends above housing 11 and may be deformed by the pressure exerted by a finger. Push button 13 has portion 14 extending through an opening provided in housing 11 and object 20. Portion 14 may be either piston or blade-shaped, or one or more rotatable rigid protuberances, etc.

Figure 2:
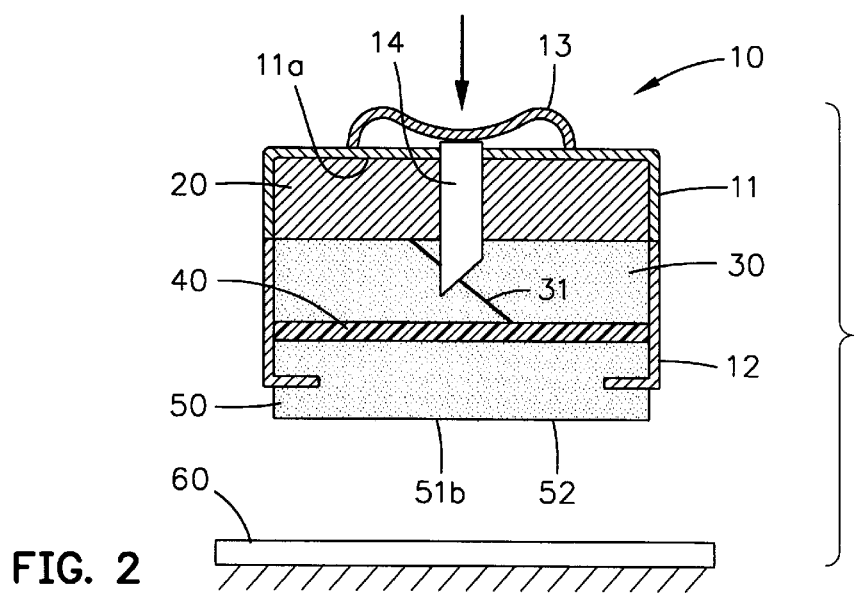
FIG. 2 shows the chemiluminescent curing system prior to being bonded to a surface by the photo-curable adhesive.

Looking to FIG. 2, deformation of push-button 13 displaces the piston, blade, rotatable protuberances, etc. to rupture membrane 31 in chemiluminescent light source 30 by breaking, cutting, or tearing it. The ruptured membrane 31 causes chemical compounds that were separated by membrane 31 to contact each another and to be at least partially mixed. This triggers, or initiates a chemiluminescent (chemical light) reaction in source 30 so that light is created and emitted. Photo-curable adhesive 50 begins to cure as its photo initiator is energized by irradiation from chemiluminescent light source 30. In other words, emitted light energizes, i.e., initiates and maintains, curing in photo-curable adhesive 50.

Push-button 13 also could be a plunger on a hypodermic needle-like structure. This structure injects a chemical compound of chemiluminescent light source module 30 into a container of another chemical compound of chemiluminescent light source module 30 to initiate a chemiluminescent reaction in source 30 to create and emit light. Furthermore, push-button 13 also could be a valve-like mechanism that would open a passageway or orifice between separated envelopes of different chemicals of chemiluminescent light source 30. This enables mixing of these chemicals to initiate chemiluminescent reaction in source 30 to produce light. Other mixing techniques also may be used.

Use of the term light as discussed herein is intended to include any or all of infrared light, visible light, or ultraviolet light that may be produced or used. Furthermore, in accordance with this inventive concept, other radiations from appropriate chemical or non-electric sources of electromagnetic radiation could be utilized which are appropriate to energize the photo initiator in the selected radiation-curable adhesive.

Tabs 12 optionally may have elongate parts suitably configured to frictionally engage chemiluminescent light source 30, transparent chemical barrier 40, and photo-curable adhesive 50, and/or may have their end parts shaped to engage mating parts on surface 60. Irrespective which fastening arrangement is chosen, transparent chemical barrier 40 is sandwiched between chemiluminescent light source 30 and photo-curable adhesive 50. A further option is that a length of reinforced tape or wire mesh may be tightly wrapped about the periphery of housing 11, chemiluminescent light source 30, transparent chemical barrier 40, and photo-curable adhesive 50 to hold them together.

For some applications, bonding system 10 might not have the modules of chemiluminescent light source 30, chemical barrier 40, and photo-curable adhesive 50 layered and substantially parallel with one another as shown in the drawings. These modules may be differently arranged with respect to each other, and chemical barrier 40 may not need to be interposed. For example, chemiluminescent light source 30, might be wrapped about the outside, or otherwise disposed so that enough of its chemically generated light can impinge upon and chemically initiate and maintain curing in photo-curable adhesive 50. Noting FIG. 3, another arrangement for bonding system 10 is that photo-curable adhesive module 50 may be directly attached to object 20. A technician, or diver will bring object 20 and photo-curable adhesive module 50 to abut mounting surface 60. Then, a hand-held chemiluminescent light source 30 will be activated by twisting, bending, flexing, crushing, etc., and the diver will bring it near, or adjacent to photo-curable adhesive module 50 and cure it with light radiated from source 30.

The particular chemiluminescent light source 30 chosen may be any of several sources available in the art. Such chemiluminescent light sources might have two or more different chemical compounds, usually in solution or slurry-like solution, separated by membrane 31. When membrane 31 is ruptured and the different chemical compounds of chemiluminescent light source 30 come together, they produce light via chemically induced fluorescence or phosphorescence processes. Additional mixing of some of the chemical compounds may be desirable to get more acceptable chemical light production, and, consequently, repeating the actuation of push button 13 and further injecting, twisting, bending, flexing, crushing, shaking, or other agitation may be needed to arrive at useful levels of intensity of radiated light. This further mixing of chemiluminescent light source 30 of bonding system 10 might be done before or after photo-curable adhesive 50 is placed against surface 60. Irrespective of how much mixing of the chemical compounds is needed, the reaction produces an excited chemical state from which light is emitted to cure photo-curable adhesive 50.

Different chemiluminescent chemical compounds in chemiluminescent light sources 30 cause emissions at different wavelengths of light. Thus, chemical compounds may be chosen to emit the wavelengths of light which initiate and produce cure in selected photo-curable adhesives 50 in accordance with this invention. By way of examples, some typical chemiluminescent light sources that may be selected are the chemical light products marketed by Omniglow Corporation, 96 Windsor St., West Springfield, Mass. 01059 under the trademarks CHEMLIGHT, CYALUME, SNAPLIGHT, and PML. These products include personnel marker lights, lightsticks, S.O.S., green-and-orange signals, and light circles. World Plastics Corporation, P.O. Box 14873, Cincinnati, Ohio 45250 also markets chemiluminescent products under the trademarks BRITEROPE and BRITESTICKS. The products themselves or compounds in these products can be selected to function in chemiluminescent source 30. In addition, other light emitting chemicals could be selected for chemiluminescent light source 30, such as the reagents employed for $H_2O_2$/oxalate reactions, peroxyoxalate chemiluminescence, polymer based oxalate sources, oxalate-fluorophore coupled compounds, etc. Various compounds will emit at different wavelengths, and, therefore, an acceptable compound may be selected to initiate and maintain curing of selected photo-curable adhesive 50.

Bonding system 10 may have membrane-like barrier 40 to assure that chemicals of chemiluminescent light source 30 and photo-curable adhesive 50 are physically separated from each another. Barrier 40 also allows appropriate wavelengths of light to pass to initiate curing of photo-curable adhesive 50. Thus, barrier 40 can be made from chemically non-reactive materials, such as some plastics which are transparent, translucent, or light filtering to pass the curing wavelengths of light from chemiluminescent light source 30 to photo-curable adhesive 50.

Photo-curable adhesive 50 can be an epoxy, methacrylate, or any type of photo-curable adhesive as long as it is tuned to the radiation of the selected chemiluminescent light source 30. Photo-curable methacrylate adhesives can be tuned to respond to different wavelengths of light depending on the photo initiator compound added to it, and photo-curable epoxies can be tuned to respond similarly may be used. Light curable composite resins, such as marketed under the trademark HELIOMOLAR by Vivavenet, might be used as adhesive 50 when visible light is emitted from chemiluminescent light source 30. Another photo-curable methacrylate resin is comprised of 50% BisGlycidal Methacrylate (BisGMA) and 50% Triethylene Glycol dimethacrylate with traces of camphorquinone and aminoalkyl methacrylate. This resin can be filled with both strontium glass or silica.

Some other typical formulations for photo-curable adhesive 50 for underwater light curing applications are:

| Lot | PC 1000 | Poly BD 605 | ENC | SB Diblock | PBD Diol | Fumed Silica | CHVE | DVE | Zonarac |
|---|---|---|---|---|---|---|---|---|---|
| 1 | 30 | . | 65 | . | . | . | . | . | . |
| 2 | 35 | . | 60 | . | . | . | . | . | . |
| 3 | 60 | . | 35 | . | . | . | . | . | . |
| 4 | 70 | . | 25 | . | . | . | . | . | . |
| 5 | 65 | 25 | . | 05 | . | . | . | . | . |
| 6 | 80 | . | . | 15 | . | . | . | . | . |
| 7 | . | . | . | . | . | . | . | 100 | . |
| 8 | . | . | . | . | . | . | 100 | . | . |
| 9 | . | 30 | . | . | . | 05 | . | 60 | . |
| 10 | . | 40 | . | . | . | 05 | 50 | . | . |
| 11 | . | 55 | . | . | . | 03 | 37 | . | . |
| 12 | . | . | . | . | 45 | 02 | 35 | . | 10 |
| 13 | . | . | . | . | 30 | 02 | 40 | . | 25 |
| 14 | 65 | 20 | . | . | 10 | 02 | . | . | . |
| 15 | 65 | 05 | . | . | 25 | 02 | . | . | . |
| 16 | 65 | 30 | . | . | . | . | . | . | . |

(All amounts are given in parts per weight; each lot of the formulations contained 3 wt % coupling agent and 2 wt % triethylene glycol except for vinyl ether formulations, and 5 wt % IOC8 photo initiator. And the listed chemicals: PC 1000 is a cycloaliphatic silicone diepoxide resin supplied by Polyset Co., P.O. Box III, Mechanicville, N.Y. 12118; IOC8 is (4-octyloxyphenyl)phenyliodonium hexafluoroantimonate supplied by General Electric Silicones, 260 Hudson River Rd., Waterford, N.Y. 12188; Poly BD 605 is an epoxidized elastomer, PBD Diol is polybutadiene diol, and SB is styrene-butadiene block polymer supplied by Shell Chemical Co., Houston, Tex.; ENR is Epoxidized natural rubber supplied by W. Symington & Son, Ltd. Bath House, 53/60 Holborn Viaduct, London ECIA 2ES,UK; Fume Silica is Aerosil R-812 supplied by Degussaf Inc., 2 Pennsylvania Plaza, New York, N.Y. 10001; CHVG is 1,4-cyclohexylmethyldivinyl and DVE is diethylene glycol divinyl ether both supplied by International Specialty Products, 1361 Alps Road, Wayne N.J. 07470-3688; triethylene glycol is supplied by Aldrich Chemical Co., P.O. Box 355, Milwaukee, Wis. 53201; coupling agent (A-187) is 2(3epoxycyclohexylethyl)trimethoxysilane supplied by Union Carbide Corp., 39 Old Rigebury Rd., Danbury, Conn. 06817-0001 or Gelest, Inc., 612 William Leigh Dr., Tullytown, Pa. 19007-6308; and Zonatac is a terpene resin supplied by Arizona Chemical Co., 1001 E. Business Highway 98, Panama City, Fla. 32901).

Whatever compound is selected for photo-curable adhesive 50, removable cap 51*a*, or protective skin-like covering 51*b* is provided on its outwardly facing surface 52. When bonding system 10 is to be attached, cap 51*a*, or covering 51*b* is removed to expose surface 52 just prior to placing it on mounting surface 60. Optionally, some uses of this inventive concept may call for photo-curable adhesive 50 being injected or dispensed onto mounting surface 60, e.g., to repair a surface or to mount object 20 onto surface 60 directly.

In operation, system 10 may adhesively attach object 20 to surface, or substrate 60 in different environments, including submerged locations. Object 20 is placed next to mounting surface 60. Next, cap 51*a* or covering 51*b* is removed from photo-curable adhesive 50. Push button 13 is pushed (or activated) and portion 14 breaks membrane 31 that separates chemiluminescent chemicals of source 30, see FIG. 2.

As mentioned above, chemiluminescent light source 30 could be separated from object 20, barrier 40, and photo-curable adhesive 50, or only photo-curable adhesive 50 could be joined to object 20. Chemiluminescent light source 30 could be wrapped around photo-curable adhesive 50, or hand-held, for example, and could be brought adjacent to radiate light onto photo-curable adhesive 50.

As membrane 31 breaks and, possibly, the chemiluminescent chemicals are further mixed, shaken or otherwise agitated, the chemiluminescent chemicals emit light. Immediately prior to or during this time, exposed, outwardly facing surface 52 is placed against mounting surface 60. Emitted light continues to pass through transparent barrier 40 to photo-curable adhesive 50. Photo-curable adhesive 50 begins to cure as its photo initiator is energized by irradiation from chemiluminescent light source 30. Object 20 is bonded to surface 60 as cure of photo-curable adhesive 50 progresses. Total curing of photo-curable adhesive 50 may not be necessary for object 20 to remain bonded for its needed function (or service).

Figure 3:
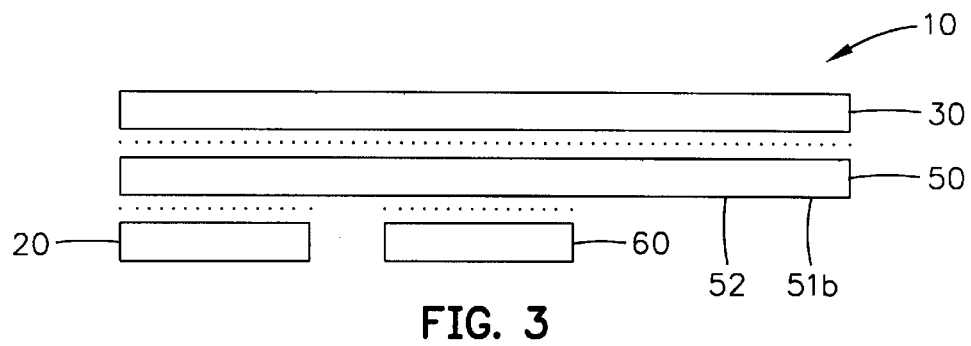
FIG. 3 shows another embodiment of this invention.

Referring to FIG. 3, bonding system 10 could be strip or layer-shaped modules of chemiluminescent light source 30 and photo-curable adhesive 50. These modules both could be contained in radiation-transparent envelopes that permit passage of radiation emitted from chemiluminescent light source 30 to photo-curable adhesive 50, for example. The envelopes themselves could function as barrier 40 as discussed above. Of course, the envelope for photo-curable adhesive 50 would have to have a removable cap 51*a*, or protective skin-like covering 51*b* on its outwardly facing surface 52 to expose adhesive for bonding onto a surface.

The modules of chemiluminescent light source 30 and photo-curable adhesive 50 of FIG. 3 could be joined together (glued, tied, extruded in adjoining, elongate or bag-like, radiation-transparent containers, etc.). These modules of chemiluminescent light source 30 and photo-curable adhesive 50 also might be separated from one another in differently-shaped, radiation-transparent envelopes, and when bonding photo-curable adhesive 50, these separated modules could be brought in close proximity to emit chemiluminescent radiation from chemiluminescent light source 30 onto photo-curable adhesive 50. Either of these joined-together or separated structures can have a variety of configurations, such as coextensive rod-like, planar, concentric, or coiled arrangements of modules of chemiluminescent light sources 30 and photo-curable adhesives 50, depending on the use that is to be made of them. These joined-together or separated structures, can be made to remove chemiluminescent light source module 50 from photo-curable adhesive module 30 after photo-curable adhesive module 30 has cured and the desired bonding has been effected. Furthermore, in all embodiments of this inventive concept, it is an option to have parts of the chemical compounds used for generation of chemiluminescent light and parts of the chemical compounds used to function as a photo-curable adhesive to be mixed together. This may be done so long as they are compatible and do not interfere with each other's function and operation.

The disclosed components and their arrangements as disclosed herein all contribute to the novel features of this invention. These novel features assure more reliable and effective initiation and curing of photo-curable adhesive 50 and bonding of object 20 onto bonding surface 60 and may be differently shaped. Surface 60 could be differently contoured in nearly any shape; however, essential components of bonding system 10 also need to be similarly shaped to contiguously accommodate such a surface. This would not present much difficulty, however, since pliant photo-curable adhesive 50 usually can be easily molded. Tailoring these components for these different surfaces is well within the scope of this inventive concept. Furthermore, having this disclosure in mind, one skilled in the art to which this invention pertains will select and assemble components for bonding system 10 from among a wide variety available in the art and appropriately interconnect them to satisfactorily function as the disclosed invention which relies on different chemiluminescent light sources 30 emitting different wavelengths of light to cure different photo-curable adhesives 50. Therefore, the disclosed arrangement is not to be construed as limiting, but rather, is intended to be demonstrative of this inventive concept.

In accordance with this invention bonding system 10 is an inexpensive and expendable photo-curable adhesive system, and designs utilizing this system are greatly simplified over electrically powered systems. Bonding system 10 may be used where it is not expedient to use radiation from electric lamps or other sources of electrically generated radiation. System 10 does not require any electrical energy (conventional electrical power or batteries) and ancillary equipment to initiate and/or produce curing in photo-curable adhesive 50 and bonding to surface 60. Consequently, logistical support for curing photo-curable adhesive 50 is greatly reduced or eliminated.

It should be readily understood that many modifications and variations of the present invention are possible within the purview of the claimed invention. It is to be understood that within the scope of the appended claims the invention may be practiced otherwise than as specifically described.

We claim:

1. A bonding system for securing an object to a mounting surface comprising:
   a photo-curable adhesive having an outwardly facing surface to bond to a mounting surface;
   a source of chemiluminescent light disposed adjacent to said photo-curable adhesive to emit radiation of said chertiluminescent light onto said photo-curable adhesive and cure said photo-curable adhesive to bond said outwardly facing surface to said mounting surface; and
   a housing to hold said chemiluminescent light source, and said photo-curable adhesive adjacent to each other and to an object, said housing, said object, said chemiluminescent light source, and said adhesive being bonded to said mounting surface to secure said object to said mounting surface.

2. A system according to claim 1 wherein said chemiluminescent light source is adapted to be initiated underwater to bond said object to said mounting surface underwater.

3. A system according to claim 2 wherein said means for holding is comprised of a housing shaped to hold said chemiluminescent light source, said photo-curable adhesive, and said object in a compact package.

4. A system according to claim 3 further comprising:
   means for defining a chemical barrier between said chemiluminescent light source and said photo-curable adhesive, said chemical barrier defining means being transparent to said chemiluminescent light.

5. A system according to claims 2 or 4 wherein said chemiluminescent light source is comprised of at least two separated chemical compounds.

6. A system according to claim 5 further comprising:
   means for initiating radiation of said chemiluminescent light from said chemiluminescent light source wherein said emission initiating means is comprised of a structure displaceable to allow mixing of said two chemical compounds and initiate chemically induced fluorescence of chemiluminescent light from said chemiluminescent light source.

7. A system according to claim 6 in which said photo-curable adhesive providing means includes a photo initiator energized by radiation from said chemiluminescent light source.

8. A system according to claim 7 further comprising:
   means for covering said outwardly facing surface of said photo-curable adhesive, said covering means being removed before abutting said mounting surface with said outwardly facing surface and energizing said photo initiator by radiation from said chemiluminescent light source.

9. A system according to claim 8 wherein said chemiluminescent light source includes at least one of the group of chemiluminescent chemicals consisting of reagents employed for $H_2O_2$/oxalate reactions, peroxyoxalate chemiluminescent, polymer based oxalate sources, and oxalate-fluorophore coupled compounds.

10. A system according to claim 9 wherein said emission initiating means includes at least one of the group of structures consisting of a piston to break a membrane separating said two chemical compounds, displaceable blade for penetrating said membrane, rotating mechanism to tear said membrane and mix said two chemical compounds, hypodermic needle-like structure to inject one of said two chemical compounds into the other, and valve-like mechanism that would open an orifice between said separated two chemical compounds of said chemiluminescent light source.

11. A system according to claim 10 wherein said photo-curable adhesive includes at least one of the group consisting of photo-curable methacrylates, photo-curable epoxies, and light curable resin compounds.

* * * * *